United States Patent [19]
Okayama et al.

[11] Patent Number: 6,047,398
[45] Date of Patent: Apr. 4, 2000

[54] REPRODUCING METHOD, REPRODUCING APPARATUS AND RECORDING AND REPRODUCING APPARATUS USING THE SAME REPRODUCING METHOD, AND RECORDING MEDIUM HAVING THE SAME METHOD RECORDED THEREIN

[75] Inventors: Mutsuyuki Okayama, Katano; Hirofumi Nakagaki, Kadoma, both of Japan

[73] Assignee: Matsushita Electric Industrial Co., Ltd., Osaka, Japan

[21] Appl. No.: 08/886,867

[22] Filed: Jul. 2, 1997

[30] Foreign Application Priority Data

Jul. 3, 1996 [JP] Japan .................................. 8-173610

[51] Int. Cl.$^7$ .................................................. G11B 20/18
[52] U.S. Cl. ........................ 714/764; 714/777; 714/755; 360/73.11
[58] Field of Search ................................. 371/40.2, 37.1, 371/37.4; 360/73.11, 72.2; 714/764, 777, 755

[56] References Cited

U.S. PATENT DOCUMENTS

| | | | |
|---|---|---|---|
| 4,277,807 | 7/1981 | Baldwin | 360/32 |
| 4,604,747 | 8/1986 | Onishi | 371/37 |
| 5,373,511 | 12/1994 | Vekssler | 371/37.4 |
| 5,684,915 | 11/1997 | Ueda et al. | 386/68 |
| 5,696,774 | 12/1997 | Inoue et al. | 371/37.4 |
| 5,712,861 | 1/1998 | Inoue et al. | 371/37.1 |
| 5,745,317 | 4/1998 | Sano et al. | 360/73.11 |

FOREIGN PATENT DOCUMENTS

| | | |
|---|---|---|
| 0 267 029 | 5/1988 | European Pat. Off. . |
| 0 481 752 | 4/1992 | European Pat. Off. . |
| 0 596 826 | 5/1994 | European Pat. Off. . |
| 07153204 | 6/1995 | Japan . |

*Primary Examiner*—Emmanuel L. Moise
*Assistant Examiner*—Esaw Abraham
*Attorney, Agent, or Firm*—Ratner & Prestia

[57] ABSTRACT

A reproducing method for reproducing data from tracks recording signals interleaves over plural tracks, storing the reproduced data, processing the stored data by error correction, issuing an error correction disable signal in the case of data processing impossible to correct in this error correction process, and controlling so as not to issue data in the track having interleaving relation with the data delivering this error correction disable signal, and a reproducing apparatus and a recording and reproducing apparatus using this method, and only by adding the function for controlling the data to be issued on the basis of the result of detection of error correction disable, stable reproduction free from reproduction of largely objectionable image due to error can be realized.

9 Claims, 8 Drawing Sheets

REPRODUCING METHOD, REPRODUCING APPARATUS AND RECORDING AND REPRODUCING APPARATUS USING THE SAME REPRODUCING METHOD, AND RECORDING MEDIUM HAVING THE SAME METHOD RECORDED THEREIN

FIELD OF THE INVENTION

The present invention relates to a technology for recording digital signals in plural tracks, by dividing one track in recording into plural blocks, extracting at least one block from one track, and reproducing the data from a recording medium in which data undergoing error correction code encoding by interleaving signals in plural block among plural tracks are recorded, and more particularly to this reproducing method, a reproducing apparatus using this method, a recording and reproducing apparatus combined with a recording apparatus, and a recording medium having the same method recorded therein.

BACKGROUND OF THE INVENTION

In a conventional reproducing apparatus or recording and reproducing apparatus, if correction is disabled in decoding process of error correction code, a so-called error concealment for interpolating from the surrounding signal is executed and issued.

However, in the case of recording and reproducing by receiving a video signal processed by information source coding among image frames, if correction is disabled in error correction code, the so-called error concealment by interpolating from the surrounding signal requires at least part of information source coding device and decoding device, and therefore the circuit scale is very large, and it is not realistic.

To the contrary, if this error concealment is insufficient, noise due to error occurring in several tracks appears on the screen, a significant picture deterioration occurs, and a very objectionable screen is reproduced.

SUMMARY OF THE INVENTION

It is hence an aspect of the invention to present a reproducing method requiring a very small circuit scale and free from notable picture quality deterioration due to continuous appearance of noise by error on the screen if error correction is disabled during reproduction, and a reproducing apparatus and a recording and reproducing apparatus using the same.

To achieve this feature, the reproducing method of the invention comprises a step of reproducing data from a track recording interleaved signals among plural tracks, a step of storing the reproduced data, a step of correcting error of the recorded data, a step of issuing an error correction disable signal at the time of data processing unable to correct error in this error correction process, and a step of controlling so as not to issue any of data in the tracks in the interleaving relation with the data with output of error correction disable signal. Consequently, only by adding the function for controlling the signal to be issued on the basis of the result of detection of error correction disable, although the reproduced image is a still picture in a worst case, the screen is not very objectionable due to error and noise, it is effective to reproduce stably.

Moreover, in the reproducing method of the invention, the step of correcting error of stored data includes a step of de-interleaving and a step of decoding an error correction code.

Still more, in the reproducing method of the invention, the step of controlling so as not to issue any of data in the tracks in the interleaving relation with the data with output of error correction disable signal is a step of controlling so as not to issue only the signal in the block of the track containing the code word of correction disable.

The reproducing apparatus and recording and reproducing apparatus of the invention comprise means for reproducing signals recorded in tracks by interleaving among plural tracks by dividing track data into plural blocks, mans of de-interleaving the reproduced signal, decoding means for decoding an error correction code by using data from the means for de-interleaving, correction disable display means for issuing a correction disable signal when error cannot be corrected by the decoding means, and output control means so as not to issue any of the signals of the tracks having interleaving relation with the data of output of correction disable signal by this correction disable display means.

In the reproducing apparatus and recording and reproducing apparatus of the invention, moreover, the means for de-interleaving the reproduced signal includes a memory for storing the reproduced signal, and memory control means for writing and reading in the memory according to interleaving pattern.

In the reproducing apparatus and recording and reproducing apparatus of the invention, further, the output control means controls so as not to issue only the signal in the block of the track containing code word of correction disable.

The recording medium of the invention records data necessary for execution of the above reproducing method, and by using this recording medium, the reproducing apparatus, and recording and reproducing apparatus of the invention can be realized.

In this constitution, by the circuit of a very small scale for controlling not to issue a signal that cannot be corrected, noise is reduced in reproduction, so that enhancement of picture quality may be realized.

Figure 1:
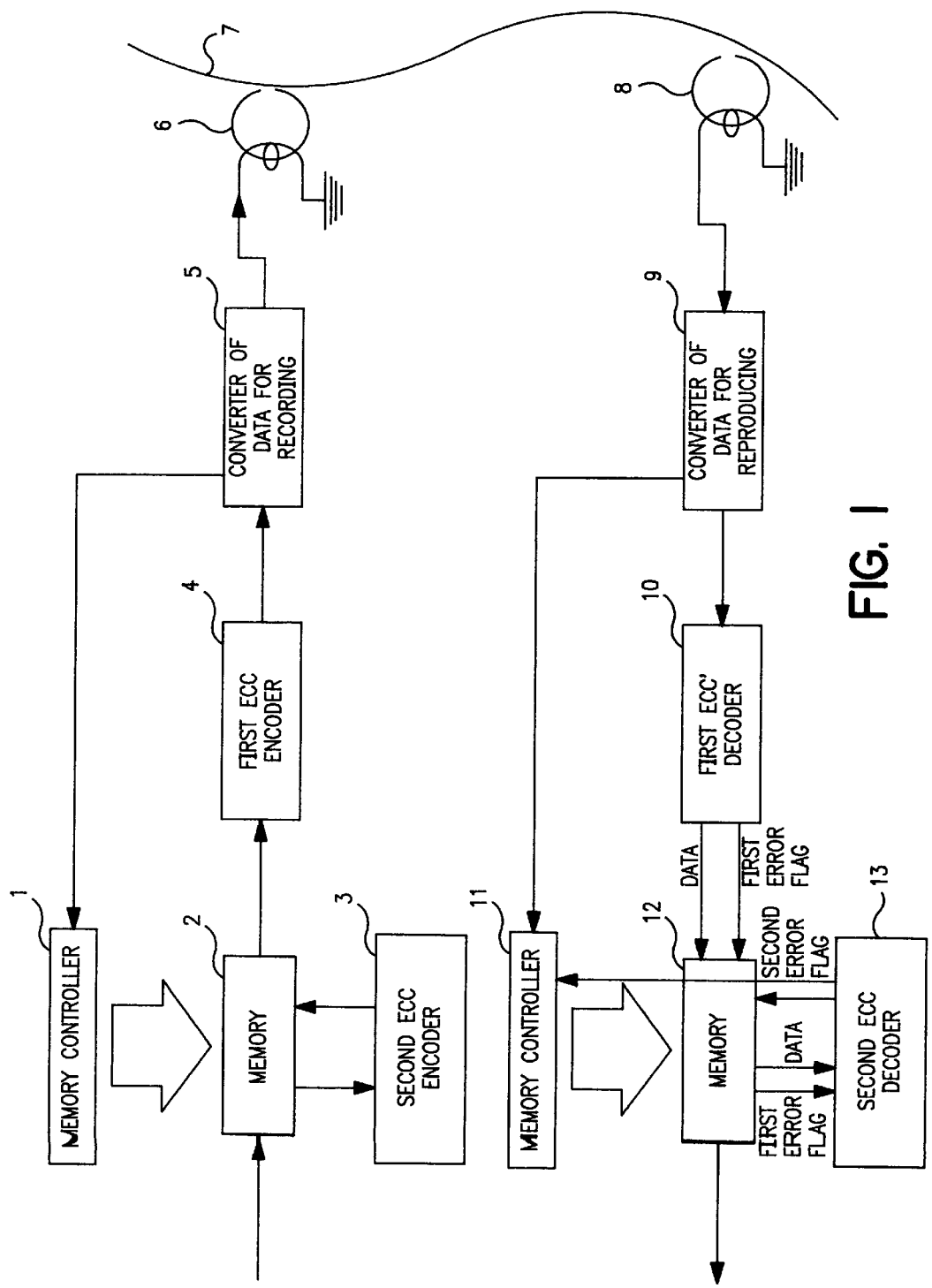
FIG. 1 is a block diagram of a recording and reproducing apparatus according to a first embodiment of the invention.

Reference Numerals
1 Memory controller
2 Memory
3 Second error correction code encoder
4 First error correction code encoder
5 Converter of data for recording
6 Recording head
7 Recording medium
8 Reproducing head
9 Converter of data for reproducing
10 First error correction code decoder
11 Memory controller
12 Memory
13 Second error correction code decoder
14 Generator of syndrome of first error correction code

DESCRIPTION OF THE EXEMPLARY EMBODIMENTS

Referring to the drawings, exemplary embodiments of recording apparatus and recording and reproducing apparatus of the invention are described in detail below.

Embodiment 1

Figure 6:
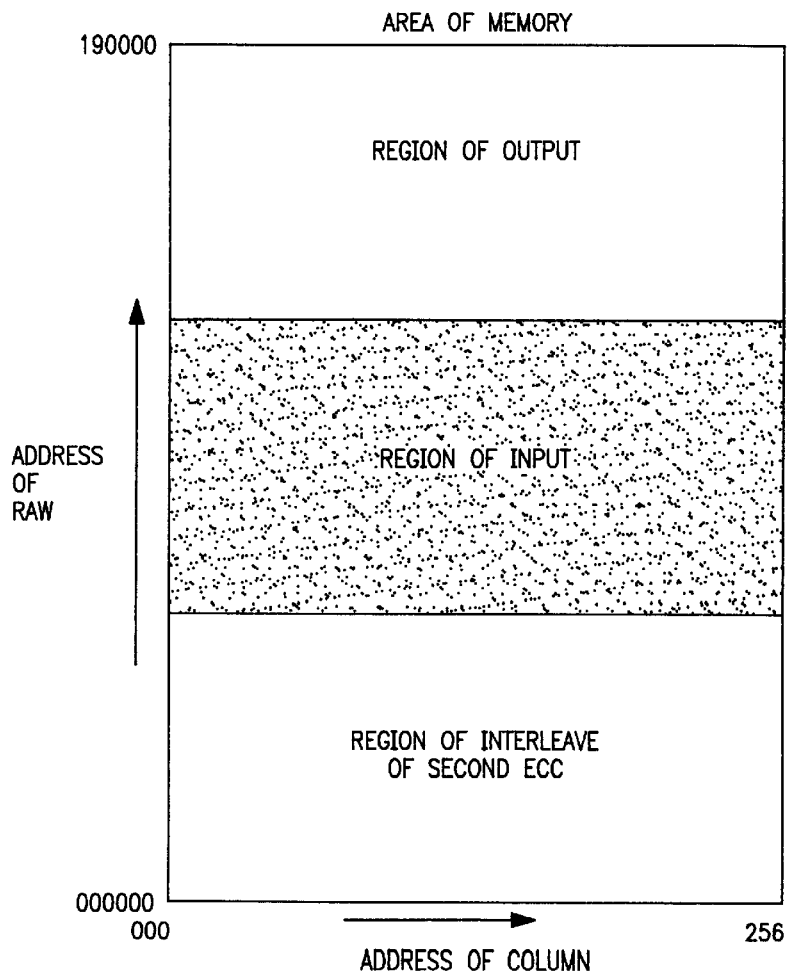
FIG. 6 is a diagram showing a memory space in an embodiment of the invention.
Figure 7:
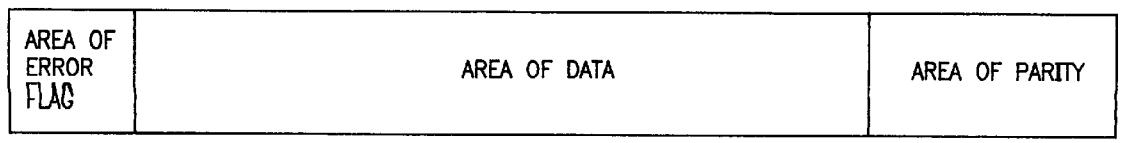
FIG. 7 is a diagram showing a data layout example in an embodiment of the invention.
Figure 8:
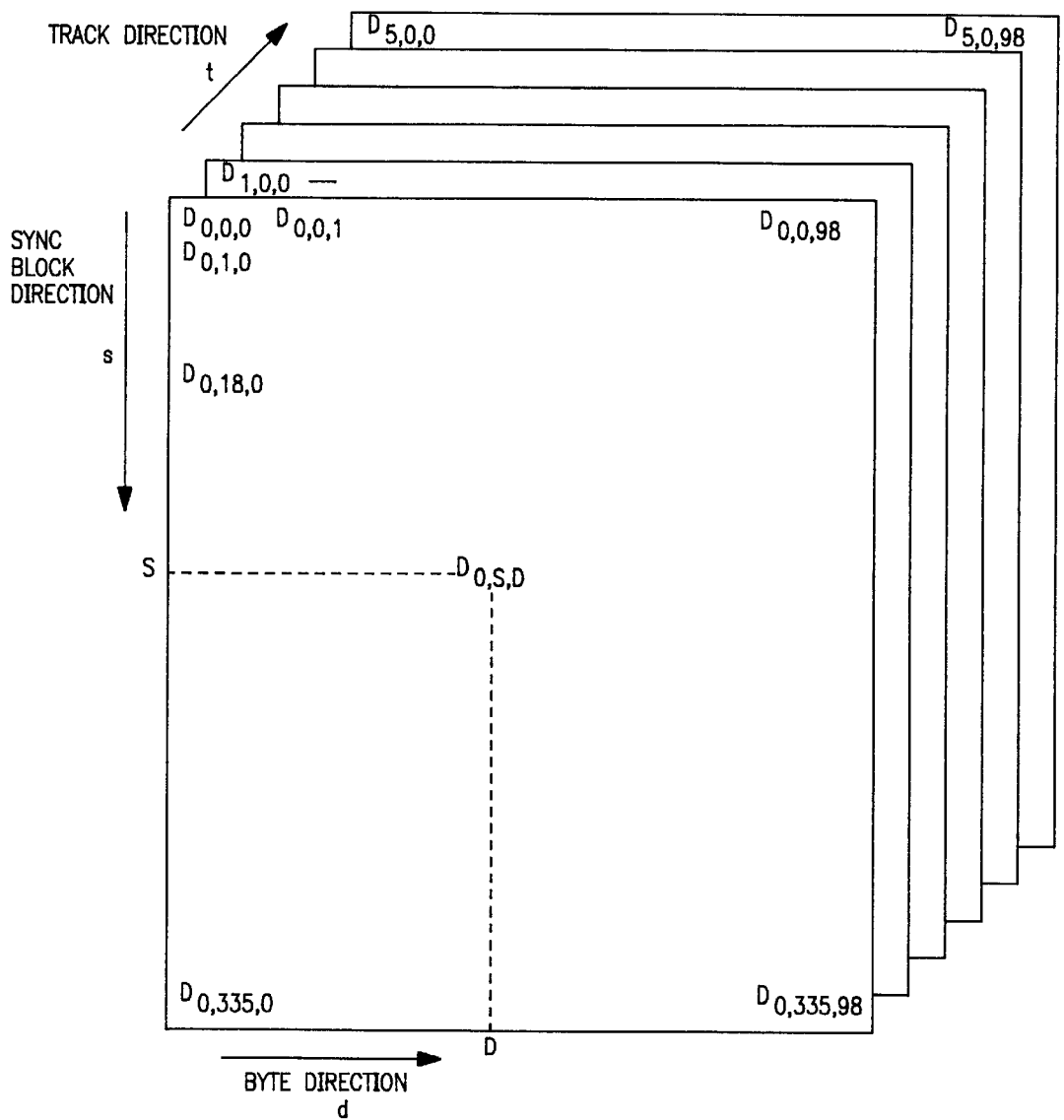
FIG. 8 is a diagram showing an example of three-dimensional shuffling of interleaving pattern in an embodiment of the invention.
Figure 9:
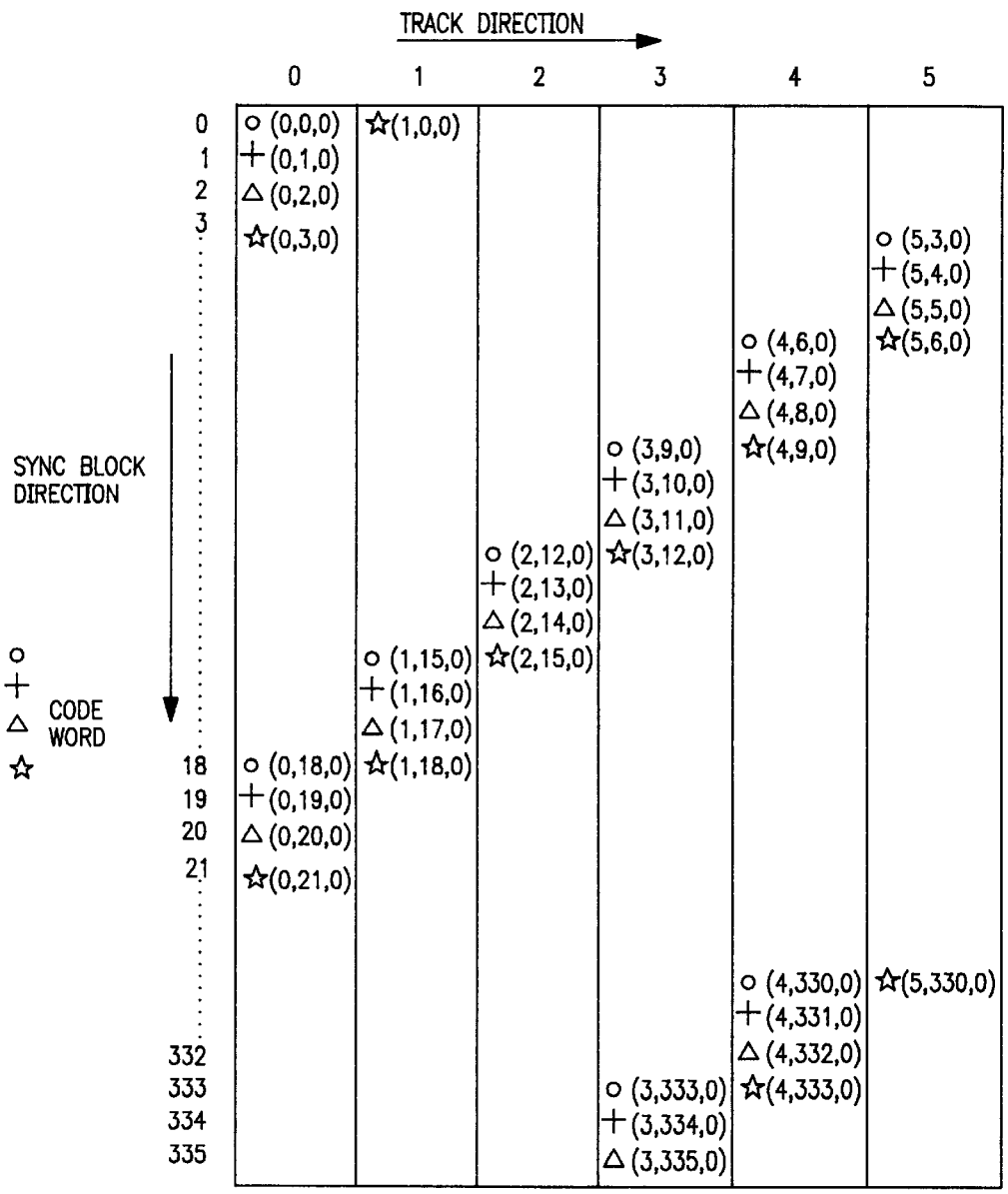
FIG. 9 is a diagram showing an example of two-dimensional shuffling of interleaving pattern in an embodiment of the invention.

A recording and reproducing apparatus according to the first embodiment of the invention is described below. FIG. 1 is a block diagram of a recording and reproducing apparatus according to a first embodiment of the invention. FIG. 6 is a diagram of a memory space, FIG. 7 is an example of a store region of an error flag, and FIG. 8 and FIG. 9 show examples of interleaving.

In FIG. 1, reference numeral 1 is a memory controller, 2 is a memory, 3 is a second error correction code encoder, 4 is a first error correction code encoder, 5 is a converter of data for recording, 6 is a recording head, 7 is a recording medium, 8 is a reproducing head, 9 is a converter of data for reproducing, 10 is a first error correction code decoder, 11 is a memory controller, 12 is a memory, and 13 is a second error correction decoder.

The first embodiment is described for the case where the input signal is an MPEG2 digital signal and data is recorded in plural tracks on a magnetic tape by a helical scanning technique. First, the recording operation is described.

A signal is transmitted from a satellite or the like, and the transmission format is decoded in a set-top box or the like, and is issued. After processing the packet information of the signal, an output signal from the set-top box is fed into the memory 2.

An example of memory space of the memory 2 is shown in FIG. 6. A memory region can be allotted, for example, where there is a region of three times of the interleaving region of the second error correction code. In the memory space, the bottom ⅓ region can be an operation region of second error correction code (ECC), the middle ⅓ region an input region, and the top ⅓ region an output region. The input data in the memory 2 is stored in the input region of the memory space in FIG. 6.

According to a specific rule, the data from the memory 2 is sent out into the second error correction code encoder 3.

At this time, the data is interleaved by a certain rule. For example, interleaving patterns are shown in FIG. 8 and FIG. 9. The interleaving format at this time is shown in polynomial 1.

$$\text{Codeword}(t, s, d) = \sum_{i=0}^{111} D_{TSD} \times X^{111-i} \quad [1]$$

$$T = (t + 5 \times I) \bmod 6 \qquad t = 0, 1, \ldots 5$$
$$S = s + 3 \times i \qquad s = 0, 1, 2$$
$$D = d \qquad d = 0, 1, \ldots, 98$$

In polynomial 1, t, s, d denote three directions of three-dimensional configuration of the data to be recorded as shown in FIG. 8, and specifically t indicates the track direction to be recorded, s is the sync block direction, and d is the direction of number of bytes. In addition, "Omod6" signifies the "remainder when O is divided by 6."

Referring to FIG. 8 and FIG. 9, the interleaving pattern is briefly described below. In FIG. 8, the data to be recorded is arranged three-dimensionally. The so-called X axis direction is named the byte direction, the Z-axis direction is the sync block direction, and the Y-axis direction is the track direction. The data flow sequence is from the byte direction to the sync block direction and to the track direction.

Extracting data according to polynomial 1, a second error correction code is generated. As known from polynomial 1, the number of tracks having interleaving relation is 6, the adjacent data within one code word decreases by one each in track number (however, 0 is followed by 5), the sync block number increases by 3 each, and the byte number is constant. Accordingly, since the byte number is constant, omitting the byte direction, it is FIG. 9 that shows the two-dimensional interleave.

In FIG. 9, the same mark indicates the same code word. Since the two-dimensional interleave excluding the byte direction is the same also in next byte number, a set of two-dimensional interleaves differing only in the byte number is a block of second error correction code. At this time, as known from the fact that there are 18 code words in the sync block direction s in FIG. 9, there are 18 second error correction code blocks in six tracks.

In this way, the data extracted from the memory 2 is transmitted to the second error correction code encoder 3, and the parity data is calculated for generating the code word for minimum distance (d2 herein) so called in the technology of error correction code encoding. The parity data calculation is performed, for example, according to polynomial 2.

$$\text{Outer\_generator}(X) = \prod_{i=0}^{9} (X - \alpha^i) \quad [2]$$

α: primitive element on $GF(2^8)$

In polynomial 2, the operation symbol Π means the operation for multiplying all elements. In addition, GF is Galois form in the error correction code encoding technology, and the primitive element indicates the element.

In polynomial 2, d2=11. The calculated parity data is written into the memory 2 according to polynomial 1 which is the same relation polynomial as above. When 18 second error correction code blocks are completed, they are issued into the first error correction code encoder 4 through the memory 2. Data input and output from memory 2 is controlled by the memory controller 1.

In the first error correction code encoder 4, parity data for generating the code word of minimum distance d1 so called in the error correction code encoding technology is calculated. For example, the parity data is calculated in polynomial 3, and sent out into the converter of data for recording 5 together with input data. In polynomial 3, d1=9. In the converter of data for recording 5, the input signal is converted into a signal suited to recording, and is sent to the recording head 6.

$$\text{Inner\_generator}(X) = \prod_{i=0}^{9} (X - \alpha^i) \quad [3]$$

$\alpha$: primitive element on $GF\ (2^8)$

For example, adding sync bit and ID bit to the code word unit of the first error correction code, a sync block is generated, and it is scrambled by an M-length code, pre-code of partial response class 4 is processed, recording is equalized to achieve optimum recording so that the error rate may be smallest when reproducing, and the signal is sent into the recording head 6. The signal is then recorded onto the recording medium 7 by the recording head 6. As the recording medium 7, a magnetic tape is assumed, but, of course, magnetic disk, optical disk or other media may be used.

The reproducing operation is described below.

The reproducing head 8 picks up a signal from the recording medium 7. At this time, the reproducing head 8 may be the same as the recording head 6 or a different one. The signal picked up by the reproducing head 8 is properly processed in the converter of data for reproducing 9, and is provided to the first error correction code decoder 10. The processing of the signal by the converter of data for reproducing 9 includes, for example, conversion of the reproduction signal into a multi-value digital signal in every clock, decoding into a binary digital signal by using a Viterbi decoder, descrambling by using an M-length signal, detecting a sync bit to determine the sync block, and decoding an ID bit. The data of the obtained result is provided to the first error correction code decoder 10.

In the first error correction code decoder 10, the first error correction code is decoded according to the decoding method disclosed, for example, in the publication "Coding Theory". (Hideki Imai, Society of Electronic Information and Communication) The data is then provided to the memory 12. If error correction fails in the first error correction code decoder 10, a first error flag is provided to the memory 12. Herein, the memory 12 may be the same as the memory 2, or a different one.

The data from the memory 12 is provided to the second error correction code decoder 13 according to polynomial 1 which is the interleaving polynomial, and the first error flag corresponding to individual data is provided to the second error correction code decoder 13. In the second error correction code decoder 13, while using the first error flag, the second error correction code is decoded according to the decoding method disclosed in the publication "Coding Theory," and the decoded data is put into the memory 12. In the second error correction code decoder 13, if a code word cannot be corrected, a second error flag is provided to the memory controller 11. This second error flag represents an error correction disable signal which indicates the information that could not be corrected of error.

The memory controller 11 controls the input and output of data in the memory 12. When the memory controller 11 receives a second error flag from the second error correction code decoder 13, it does not allow data to be provided for the portion of six tracks having interleaving relation by the six-track pulse from the converter of data for reproducing 9. In this way, only the data of the track for which a second error flag is not provided by the second error correction code decoder 13 is issued from the memory 12.

Thus, only a signal corrected of error is reproduced. Although there is a possibility of having a still picture temporarily due to a shortage of reproduction signals, an image due to error is not reproduced, and a stable reproduction of an image may be realized easily.

Since the memory controller 11 and the memory controller 1 have common functions, they may be shared commonly. The memory 2 and memory 12 may also be commonly shared. An example of a storage region of an error flag and of other data is shown in FIG. 7.

According to the embodiment described, reproduced data is stored in the memory, and output data is selected and provided depending upon a reproduction disable signal (error flag), but the same effect is obtained by data control without using memory.

In a modified example of the first embodiment 1, when the memory controller 11 receives a second error flag from the second error correction code decoder 13, the memory controller 11 may control so as not to issue the code block of the second error correction code related with the second error flag. In this case, too, the same effects as above are obtained.

Another embodiment includes the reproducing apparatus for reproducing only, excluding the recording apparatus portion (the portion composed of memory controller 1, memory 2, second error correction code encoder 3, first error correction code encoder 4, converter of data for recording 5, and recording head 6) from the constituted recording and reproducing apparatus described above.

Embodiment 2

Figure 2:
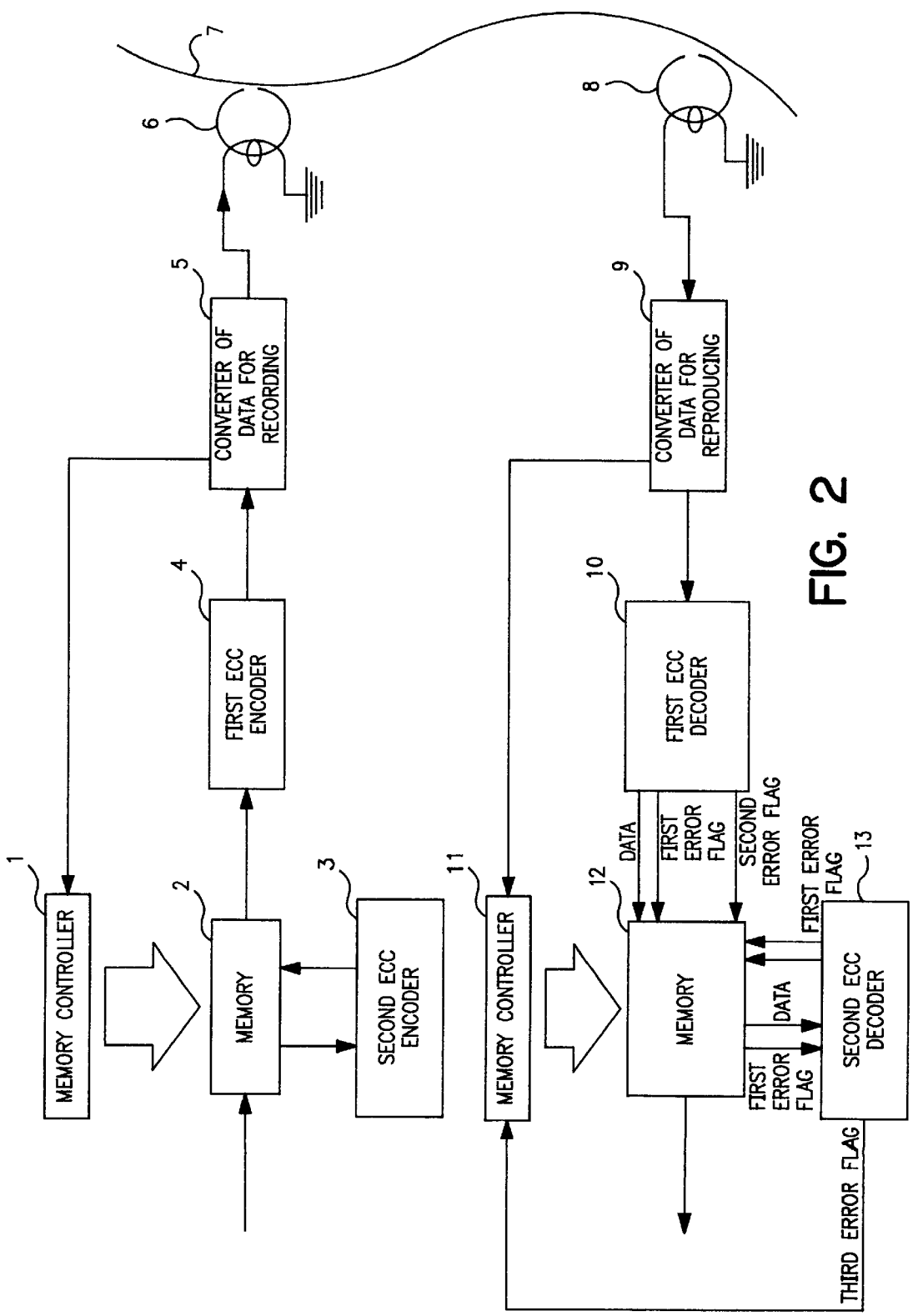
FIG. 2 is a block diagram of a recording and reproducing apparatus according to a second embodiment of the invention.

A recording and reproducing apparatus according to a second embodiment of the invention is described below. FIG. 2 is a block diagram of the recording and reproducing apparatus according to the second embodiment of the invention. The differences of the second embodiment from the first embodiment include the output of the error flag from the first error correction code decoder 10 and the operation of the memory controller 11, memory 12, and the second error correction code decoder 13.

In FIG. 2, reference numeral 1 is a memory controller, 2 is a memory, 3 is a second error correction code encoder, 4 is a first error correction code encoder, 5 is a converter of data for recording, 6 is a recording head, 7 is a recording medium, 8 is a reproducing head, 9 is a converter of data for reproducing, 10 is a first error correction code decoder, 11 is a memory controller, 12 is a memory, and 13 is a second error correction code decoder.

The description of the recording process and the operation up to the output from the converter of data for reproducing 9 are same as in the first embodiment and for brevity is not repeated. The operation of the first error correction code decoder 10, memory controller 11, memory 12, and second error correction code decoder 13 is described below.

In the first error correction code decoder 10, if correction disable occurs in any code word in the first error correction code, a first error flag is provided to the memory 12.

Let t be the maximum integer not exceeding d½, where d½ is half of the minimum distance d1 so called in the error correction code encoding technology. If t code words of the error correction code are corrected in the first error correction code decoder 10, a second error flag is issued. If d1=9, then 9/2=4.5, and therefore the maximum integer t not exceeding this value is t=4. The first error flag and second error flag are both stored in the memory 12 together with the data. According to polynomial 1 which is the interleaving polynomial, data is provided to the second error correction code decoder 13 by the memory 12.

The operation of the second error correction decoder 13 and the operation of the memory controller 11 in the case of successful correction in the second error correction code decoder 13 are same as in the first embodiment, and the explanation is omitted herein. When the second error correction code decoder 13 decodes the second error correction code while utilizing the first error flag, if a correction disable code word occurs in the second error correction code decoder 13, it processes the decoded data and provides a third error flag to the memory controller 11. This third error flag represents an error correction disable signal.

When the memory controller 11 receives a third error flag from the second error correction code decoder 13, the memory controller 11 controls so as not to issue the code word of the first error correction code carrying the first error flag and second error flag, being the code word of the first error correction code, in the second error correction code block containing the code word of second error correction code being not corrected, out of the memory 12.

Thus, control of preventing correction disabled signal from being issued as far as possible is realized in a very small circuit scale, and the noise appearing on the screen can be reduced, marked disturbance of reproduction screen can be prevented, and hence the picture quality can be enhanced.

A variation of the second embodiment includes the reproducing apparatus for reproducing only, excluding the recording apparatus portion (the portion composed of memory controller 1, memory 2, second error correction code encoder 3, first error correction code encoder 4, converter of data for recording 5, and recording head 6) from the constituted recording and reproducing apparatus described above.

Embodiment 3

Figure 3:
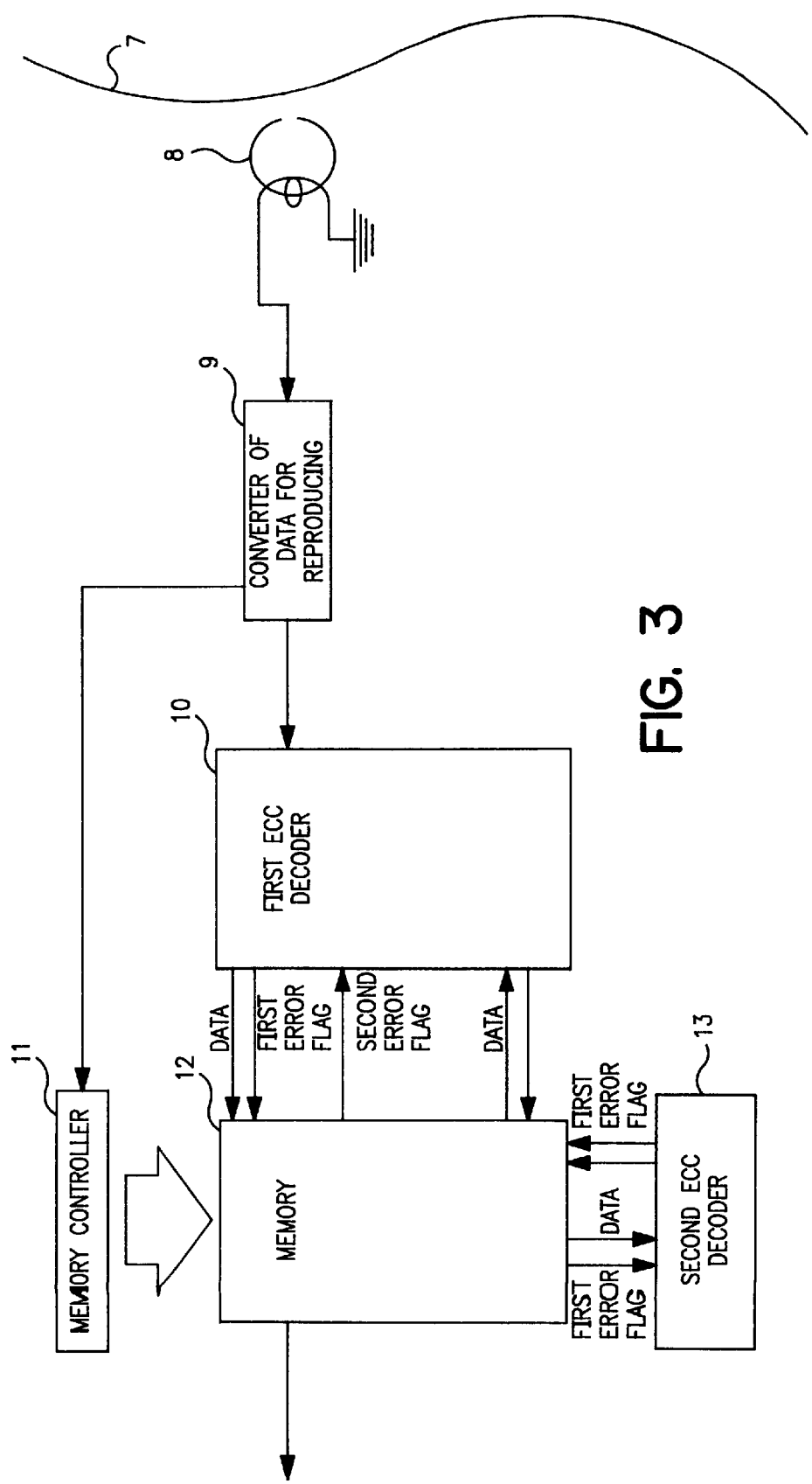
FIG. 3 is a block diagram of a reproducing unit of a recording and reproducing apparatus according to a third embodiment of the invention.

A recording and reproducing apparatus according to the third embodiment of the invention is described below. FIG. 3 is a block diagram showing of the reproducing apparatus portion of the recording and reproducing apparatus of the third embodiment of the invention. The differences of the third embodiment from the first and second embodiments include the output of the error flag from the first error correction code decoder 10 and the operation of the memory controller 11, memory 12, and second error correction code decoder 13.

In FIG. 3, reference numeral 7 is a recording medium, 8 is a reproducing head, 9 is a converter of data for reproducing, 10 is a first error correction code decoder, 11 is a memory controller, 12 is a memory, and 13 is a second error correction decoder.

The recording process and the operation up to the output from the converter of data for reproducing 9 are the same as described for the first embodiment, and for brevity are not repeated. The operation of the first error correction code decoder 10, memory controller 11, memory 12, and second error correction code decoder 13 is described below.

The signal reproduced by the converter of data for reproducing 9 is fed into the first error correction code decoder 10. In the first error correction code decoder 10, the first error correction code is decoded. The decoding method at this time may be the same as described above. Also the manner of adding the first error flag in the case of correction disable may be the same as above. However, the first parity symbol is also written into the memory 12.

The data in the memory 12 is provided to the second error correction code decoder 13 according to polynomial 1 which is the interleaving polynomial. The first error flag is also provided to the second error correction code decoder 13.

The operation of the second error correction code decoder 13 is similar as described above, but the second error correction code in the portion of the first parity symbol is also decoded.

In the event of correction disable, a second error flag is provided to the memory 12.

The corrected data being fed into the memory 12 is provided again to the first error correction code decoder 10 in the sync block unit with a second error flag. In the first error correction code decoder 10, the first error correction code is decoded using the second error flag by a decoding method such as by erasure correction. At this time, a first error flag is set up again in the sync block that cannot be corrected. That is, if the first error flag is already set up, it is left as it is, and if not, it is set up. To the contrary, when corrected successfully, the first error flag is removed. Together with the first error flag, the signal is stored in the memory 12. The sync block not carrying a first error flag is issued from the memory 12.

Such input and output control of the memory 12 is carried out by the memory controller 11.

In this case, the first error correction code decoder 10 corresponds to a third error correction code decoder for further decoding the first error correction code in the sync block of which second error correction code is decoded, so as not to provide the data relating to correction disable in the case of correction disable. The first error correction code decoder 10 shares the third error correction code decoder, and in this case, as compared with the one not sharing, the operating speed of the first error correction code decoder 10 is twice as fast.

Figure 4:
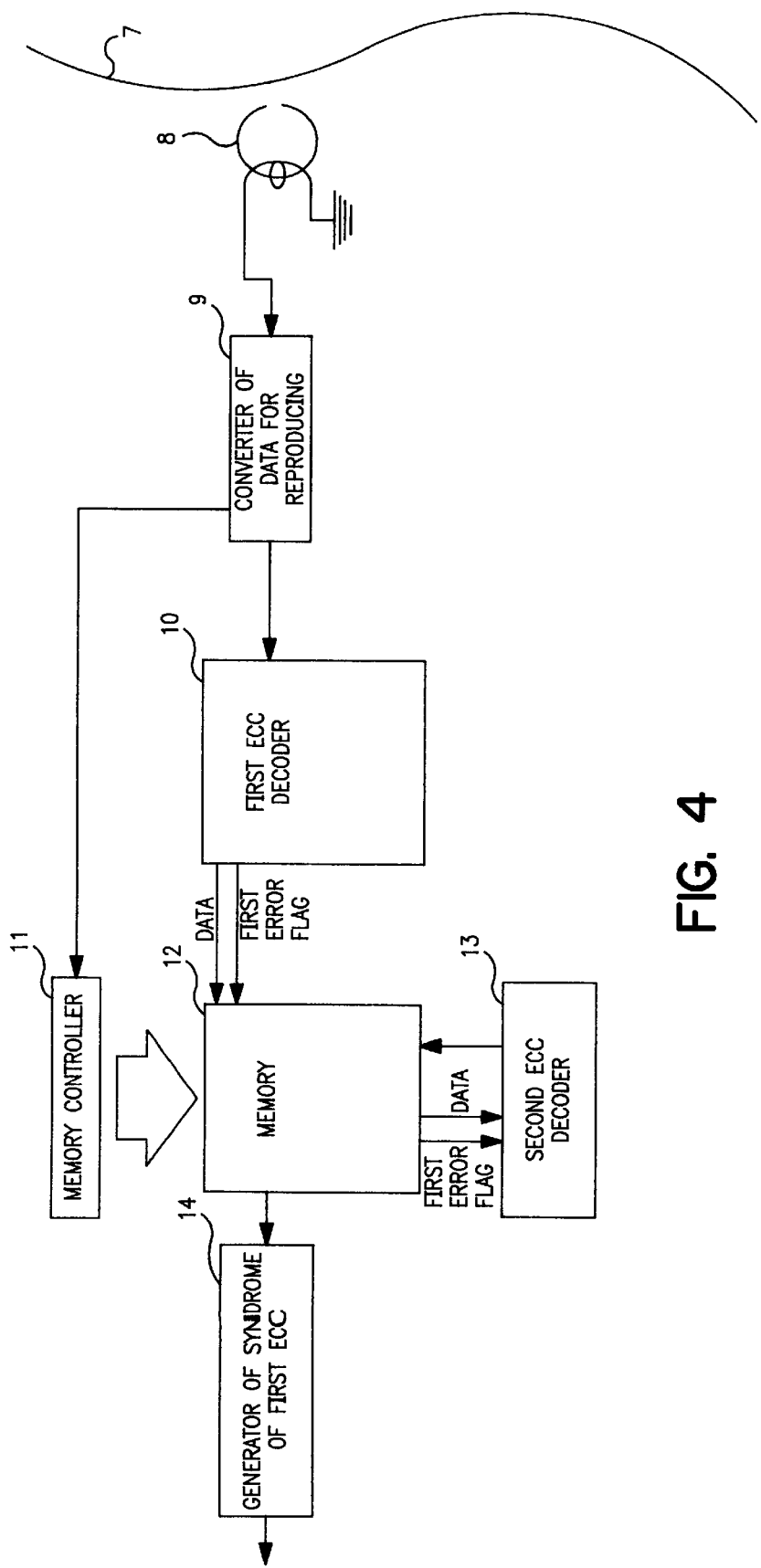
FIG. 4 is a block diagram of a reproducing unit of a recording and reproducing apparatus according to a fourth embodiment of the invention.

The third error correction code decoder may be realized by the generator of syndrome of first error correction code 14 as described later with reference to the fourth embodiment as shown in FIG. 4.

In the third embodiment, the first error correction code decoder 10 serving also as the third error correction code decoder sets up the first error flag again in the correction disable sync block in the second operation for decoding the first error correction code. If the first error flag is already set up, it is left as it is, and if not, it is set up. To the contrary, when corrected successfully, the first error flag is removed. Together with the first error flag, the data is stored in the memory 12. The sync block not carrying a first error flag is issued from the memory 12, and therefore both the function of processing to correct error and the function of preventing output of error correction disable signal are provided, to further enhance picture quality.

If the input and output timing is not adjusted by one memory 12 only, as the memory for second decoding of first error correction code, of course, other memory than the memory 12 may be also used.

When setting up the first error flag again, meanwhile, the first error signal may be set up again when the number of corrections is t or more (t being an integer not exceeding d½). For example, in the case of d1=9, it is t=4.

A variation of the third embodiment includes the reproducing apparatus for reproduction only, excluding the recording apparatus portion (not shown) from the recording and reproducing apparatus.

Embodiment 4

A recording and reproducing apparatus according to the fourth embodiment of the invention is described below. FIG. 4 is a block diagram showing the reproducing apparatus portion of the recording and reproducing apparatus of the fourth embodiment of the invention. The differences of the fourth embodiment from embodiments 1, 2 and 3 include a generator of syndrome of first error correction code 14 as third error correction code decoder, the output of an error flag from the first error correction code decoder 10 and the operation of the memory controller 11, memory 12, and second error correction code decoder 13.

In FIG. 4, reference numeral 7 is a recording medium, 8 is a reproducing head, 9 is a converter of data for reproducing, 10 is a first error correction code decoder, 11 is a memory controller, 12 is a memory, 13 is a second error correction decoder, and 14 is a generator of syndrome of first error correction code.

The recording process and the operation up to the output from the converter of data for reproducing 9 are the same as in the first embodiment, and for brevity their description is not repeated. The operation of the memory controller 11 and first error correction code decoder 10 is described below.

The signal reproduced by the converter of data for reproducing 9 is provided to the first error correction code decoder 10. In the first error correction code decoder 10, the first error correction code is decoded. The decoding method at this time may be the same as described above. Also the manner of adding the first error flag in the case of correction disable may be same as above. However, the first parity symbol is also written into the memory 12.

The data in the memory 12 is provided to the second error correction code decoder 13 according to polynomial 1 which is the interleaving polynomial. The first error flag is also issued into the second error correction code decoder 13.

The operation of the first error correction code decoder 13 is same as above, but the second error correction code in the portion of the first parity symbol is also decoded.

In the event of correction disable, a second error flag is provided to the memory 12.

The corrected data being provided to the memory 12 is provided to the generator of syndrome of first error correction code 14 in the sync block unit.

The input and output of the memory 12 is controlled by the memory controller 11.

In the generator of syndrome of first error correction code 14, the syndrome of the first error correction code is calculated. Only the sync block judged to be free from error is output, while a sync block for which syndrome is not completely 0 is not issued.

If the input and output timing is not adjusted by one memory 12 only, a memory other than memory 12 may also be used as the memory for second decoding of first error correction code.

Instead of the generator of syndrome of first error correction code 14, other first error correction code decoder of nearly the same constitution as the first error correction code decoder 10 may be separately prepared, and not only the data from the memory 12 but also the second error flag may be fed, and by the decoding method using the second error flag, for example, by erasure correction, the first error correction code may be decoded, and the corrected sync block may be issued, while uncorrected sync block may be prevented from being issued.

Figure 5:
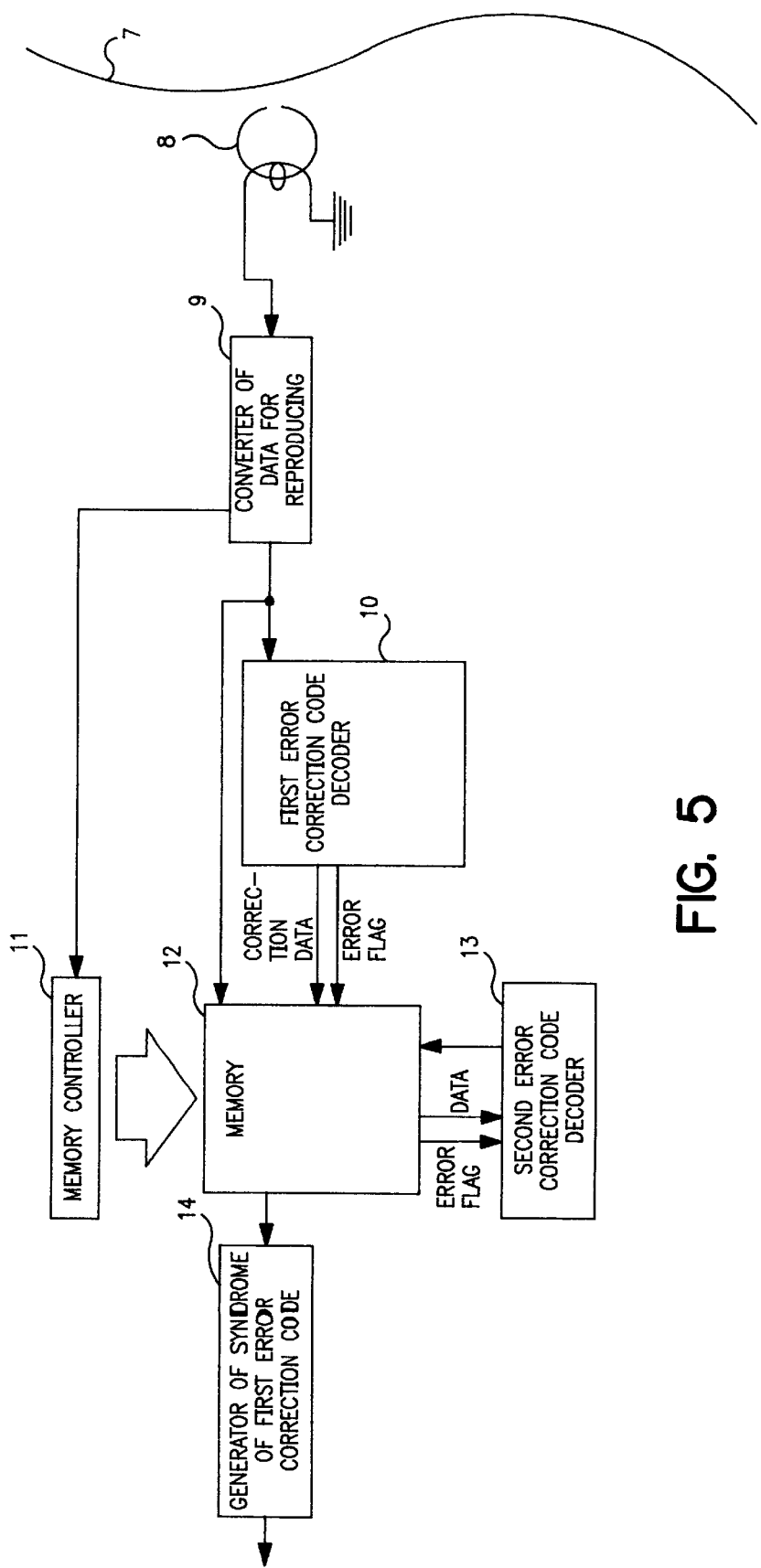
FIG. 5 is a block diagram of a reproducing unit of a recording and reproducing apparatus according to modified embodiment 4 of the invention.

FIG. 5 is a block diagram showing error correction (ECC) of the first error correction code according to the fourth embodiment, by exclusive- OR, using the memory 12, of error data from the converter of data for reproducing 9 and correction data from the first error correction code decoder 10.

Incidentally, the generator of syndrome of first error correction code 14 corresponds to "a third error correction code decoder for further decoding the first error correction code in the sync block of which second error correction code is decoded, so as not to issue the data relating to correction disable in the case of correction disable" of claim 16.

Thus, control to prevent correction disable signal from being issued can be realized in a very small circuit scale, and noise appearing on the screen can be reduced, and the picture quality can be enhanced.

A variation of the fourth embodiment includes the reproducing apparatus for reproduction only, excluding the recording apparatus portion (not shown) from the recording and reproducing apparatus shown in FIG. 4 or FIG. 5.

By executing the invention, as described herein, the reproduced image may be a still picture in a worst case, but control for preventing correction disable signal from being reproduced as far as possible is realized automatically, and a largely disturbed screen due to error is not reproduced, thereby realizing the reproducing method, reproducing apparatus, and recording and reproducing apparatus capable of reproducing stably in a small circuit scale.

What is claimed is:

1. A recording and reproducing apparatus comprising:
   an interleaving device comprising a memory for storing data and a memory controller for controlling writing and reading from the memory according to an interleaving pattern;
   a converter of data for recording for converting interleaved data received from the interleaving device into a signal suitable for recording on a recording medium having a plurality of tracks each having a plurality of blocks, each block having a plurality of sync blocks, where the data is interleaved among the plurality of tracks and encoded according to a first error correction code having a corresponding predetermined value t and encoded according to a second error correction code; and
   a reproduction apparatus comprising:
      a first error correction code decoder for decoding the first error correction code, correcting errors in the data, and providing a number of errors corrected by the first error correction code corresponding to each sync block;
      a memory for de-interleaving the data;
      a second error correction code decoder for decoding the second error correction code and outputting a correction disable signal corresponding to a sync block of the data if the second error correction code decoder did not correct an error in the data in the sync block; and
      a memory controller for preventing the memory from outputting the sync block having a corresponding correction disable signal also has a corresponding number of errors corrected greater than the predetermined number t.

2. The reproduction apparatus according to claim 1, wherein the first error correction code encoding has a minimum distance of d1 and the predetermined number t is the maximum integer not exceeding d½.

3. The reproduction apparatus according to claim 1, wherein the first error correction code encoding has a minimum distance of d1 and the predetermined number t is the maximum integer not exceeding (d½)−1.

4. The recording and reproducing apparatus according to claim 1, wherein the first error correction code encoding has a minimum distance of d1 and the predetermined number t is the maximum integer not exceeding d½.

5. A recording and reproducing apparatus according to claim 1, wherein the first error correction code encoding has a minimum distance of d1 and the predetermined number t is the maximum integer not exceeding (d½)−1.

6. A reproduction apparatus for reproducing data stored on a recording medium, the recording medium having a plurality of tracks each having a plurality of blocks each having a plurality of sync blocks, wherein the data is interleaved among the plurality of tracks and encoded according to a first error correction code encoding and according to a second error correction code encoding, the apparatus comprising:

a first error correction code decoder for decoding the first error correction code and generating a parity signal;

a memory for de-interleaving the data;

a second error correction code decoder for decoding the de-interleaved data according to the second error correction code using the parity signal and generating corrected data;

a memory controller for controlling memory writing, reading and interleaving, controlling writing and reading of the parity signal and of the corrected data a generator of syndrome of the first error correction code for calculating the syndrome in one of the plurality of sync blocks in which the second error correction code is decoded, and preventing output of said one of the plurality of sync blocks if its syndrome is not zero.

7. A reproduction apparatus according to claim 6, wherein said reproduction apparatus is included in a recording and reproducing apparatus comprising:

an interleaving device for providing interleaved data, and a converter of data for recording for converting the interleaved data into a signal suitable for recording on the recording medium.

8. A reproduction apparatus for reproducing data stored on a recording medium, the recording medium having a plurality of tracks each having a plurality of blocks, where said data is interleaved across said plurality of tracks, the apparatus comprising:

a memory for de-interleaving a portion of said data;

an error correction code decoder for correcting errors in said portion of said read data by decoding an error correction code of said portion of said read data and issuing an error correction disable signal corresponding to said portion of said read data if all errors in said portion of said read data were not corrected;

a memory controller for preventing issue of all of said data in said plurality of tracks across which said portion of said read data having a corresponding error correction disable signal is interleaved.

9. A reproduction apparatus according to claim 8, wherein said reproduction apparatus is included in a recording and reproducing apparatus comprising:

an interleaving device for providing interleaved data, and a converter of data for recording for converting the interleaved data into a signal suitable for recording on the recording medium.

* * * * *

UNITED STATES PATENT AND TRADEMARK OFFICE
CERTIFICATE OF CORRECTION

PATENT NO. : 6,047,398
DATED : April 4, 2000
INVENTOR(S) : Okayama et al.

It is certified that error appears in the above-identified patent and that said Letters Patent is hereby corrected as shown below:

<u>Column 12,</u>
Delete lines 1 through 17, and insert:
--8. A reproduction apparatus for reproducing data from a signal stored on a recording medium, the recording medium having a plurality of tracks each having a plurality of blocks each having a plurality of sync blocks, wherein the data is interleaved among the plurality of tracks and encoded according to a first error correction code encoding and according to a second error correction code encoding, the apparatus comprising:

a converter of data for reproducing for converting the signal stored on the recording medium into uncorrected data;

a first error correction code decoder for decoding the uncorrected data according to the first error correction code and generating a parity signal and first corrected data;

a memory for de-interleaving;

a second error correction code decoder for decoding the data according to a second error correction code using the parity signal and generating second corrected data;

a memory controller for controlling memory writing, reading and interleaving, controlling writing and reading of the parity signal, the first corrected data, and the second corrected data;

UNITED STATES PATENT AND TRADEMARK OFFICE
CERTIFICATE OF CORRECTION

PATENT NO. : 6,047,398
DATED : April 4, 2000
INVENTOR(S) : Okayama et al.

It is certified that error appears in the above-identified patent and that said Letters Patent is hereby corrected as shown below:

a generator of syndrome of the first error correction code for calculating the syndrome in one of the plurality of sync blocks in which the second error correction code is decoded, and preventing output of the one of the purality of sync blocks if its syndrome is not zero, wherein syndromes are calculated using an exclusive –OR of uncorrected data from the converter of data for reproducing and the first corrected data.

Signed and Sealed this

Twenty-first Day of August, 2001

*Attest:*

*Attesting Officer*

NICHOLAS P. GODICI
*Acting Director of the United States Patent and Trademark Office*